(12) United States Patent
Tucker et al.

(10) Patent No.: US 11,872,765 B2
(45) Date of Patent: Jan. 16, 2024

(54) GENERATION OF DESIGNS FOR MULTI-FUNCTIONAL OBJECTS

(71) Applicant: Hewlett-Packard Development Company, L.P., Spring, TX (US)

(72) Inventors: David James Tucker, Vancouver, WA (US); David Woodlock, Vancouver, WA (US); Jun Zeng, Palo Alto, CA (US); Michelle Lynn Bockman, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 166 days.

(21) Appl. No.: 17/252,318

(22) PCT Filed: Mar. 29, 2019

(86) PCT No.: PCT/US2019/025019
§ 371 (c)(1),
(2) Date: Dec. 15, 2020

(87) PCT Pub. No.: WO2020/204896
PCT Pub. Date: Oct. 8, 2020

(65) Prior Publication Data
US 2022/0009172 A1 Jan. 13, 2022

(51) Int. Cl.
*B29C 64/386* (2017.01)
*B33Y 50/00* (2015.01)
*G06F 30/10* (2020.01)
*G06F 119/08* (2020.01)
*G06F 119/18* (2020.01)

(52) U.S. Cl.
CPC ............ *B29C 64/386* (2017.08); *B33Y 50/00* (2014.12); *G06F 30/10* (2020.01); *G06F 2119/18* (2020.01)

(58) Field of Classification Search
CPC ....... B29C 64/386; B33Y 50/00; G06F 30/10; G06F 2119/18
See application file for complete search history.

(56) References Cited

U.S. PATENT DOCUMENTS

| | | | |
|---|---|---|---|
| 5,340,433 A | 8/1994 | Crump | |
| 9,468,131 B2 | 10/2016 | Brandt et al. | |
| 2017/0036578 A1* | 2/2017 | White | B60N 2/643 |
| 2017/0184086 A1 | 6/2017 | Scancarello et al. | |
| 2018/0178693 A1 | 6/2018 | Iyer et al. | |
| 2018/0268086 A1 | 9/2018 | Makeig | |
| 2020/0231428 A1* | 7/2020 | Migneco | B68G 7/00 |

FOREIGN PATENT DOCUMENTS

| | | |
|---|---|---|
| DE | 102016123017 | 6/2017 |
| DE | 102016225837 | 6/2018 |

* cited by examiner

*Primary Examiner* — Bijan Mapar
(74) *Attorney, Agent, or Firm* — Michael Dryja (57) ABSTRACT

An example of an apparatus is provided. The apparatus includes an input device to receive design data. The design data includes information about a geometry and load characteristics of an object. The apparatus further includes a structural design engine to generate print data to print the object on a three-dimensional printer based on the design data. The apparatus also includes a fluid design engine to generate fluidic data. The fluidic data represents a fluid channel within the object. In addition, the apparatus includes an output engine to generate an output file based on the print data and the fluidic data.

18 Claims, 7 Drawing Sheets

GENERATION OF DESIGNS FOR MULTI-FUNCTIONAL OBJECTS

BACKGROUND

Multi-functional objects may be used to replace and improve common items by reducing the number of separate components to achieve the multiple functions. A three-dimensional printing device may be used to generate multi-functional parts from data files. In general, the three-dimensional printing device receives a single data file with information used by the printing device to build the multi-functional object.

BRIEF DESCRIPTION OF THE DRAWINGS

Reference will now be made, by way of example only, to the accompanying drawings in which.

DETAILED DESCRIPTION

The manufacturing of multi-functional objects using three-dimensional (3D) printing technology or other additive manufacturing processes, may be used in some instances. Such processes may use materials associated with 3D printing technology and be subject the productivity of machines in a 3D printing process.

For example, multi-functional objects in automobile applications, such as seating and fluidic connectors, may be fabricated using a 3D printing process. In particular, a modern automobile seat cushion may combine multiple functions into a single object. One function of an automobile seat cushion may be to support a load, such as a person. The support function may be designed to reduce pressure points to provide a more comfortable feel during use. In addition, seat cushions may also provide heating and cooling for added comfort. One way to provide heating and cooling may be provided by supplying warm or cool air to be distributed at a surface of the seat cushion. By specifically designing fluid channels through the seat cushion to deliver the air, substantially uniform temperature control may be achieved. Designing and fabrication of such a multi-functional object is prohibitively expensive without using 3D printing technology. Accordingly, present fabrication processes involve assembling multiple parts to form the multi-functional object.

Another example of a multi-functional object is a fluidic connector to deliver fluid at a desired flow rate through a confined volume. The design of the fluid channel from an inlet to an outlet may be configured to adjust for a target flow rate. Modern automobiles use many different fluids that may be delivered from one location to another location on the automobile. For example, windshield wash fluid may be delivered from a reservoir (not shown) and applied to a windshield. Other examples of fluids in an automobile may include gasoline, coolant, oils, refrigerant, etc. In this example, lattice structures may be built around the fluid channel. In addition, automobiles may have cavities and void spaces which may provide resonance chambers for sound as well as present difficulty to orient and align automobile parts within the narrow confines of the cavity or void space. Therefore, the multi-functional object may be designed with a lattice structure to fit within an irregularly shaped cavity. The multi-functional object may also be configured to dampen vibrations and to custom fir a space to reduce the likelihood of an installation error.

An apparatus to facilitate the design and fabrication of multi-functional objects is provided. By combining the designs of the multiple functions in to a single output file for 3D printing, the apparatus allows for the testing and fabrication of single unitary multi-functional objects without the need for methods of fabricating such multi-functional objects which typically involve assembling multiple parts. In particular, the apparatus provides for the ability to design the structural features of the multi-functional object and a fluid channel separately to be subsequently combined into a single model for a single multi-functional object which may be printed using 3D printing technology. Therefore, the structural features may be designed separately from the fluid channel and combined automatically to integrate the fluid channel within the lattice structure of the multi-functional object. Although the present examples involve a fluid channel, any combination of functions may be implemented, such as embedding electrical wiring or introducing lattice and surface texture to achieve secondary mechanical properties.

Figure 1:
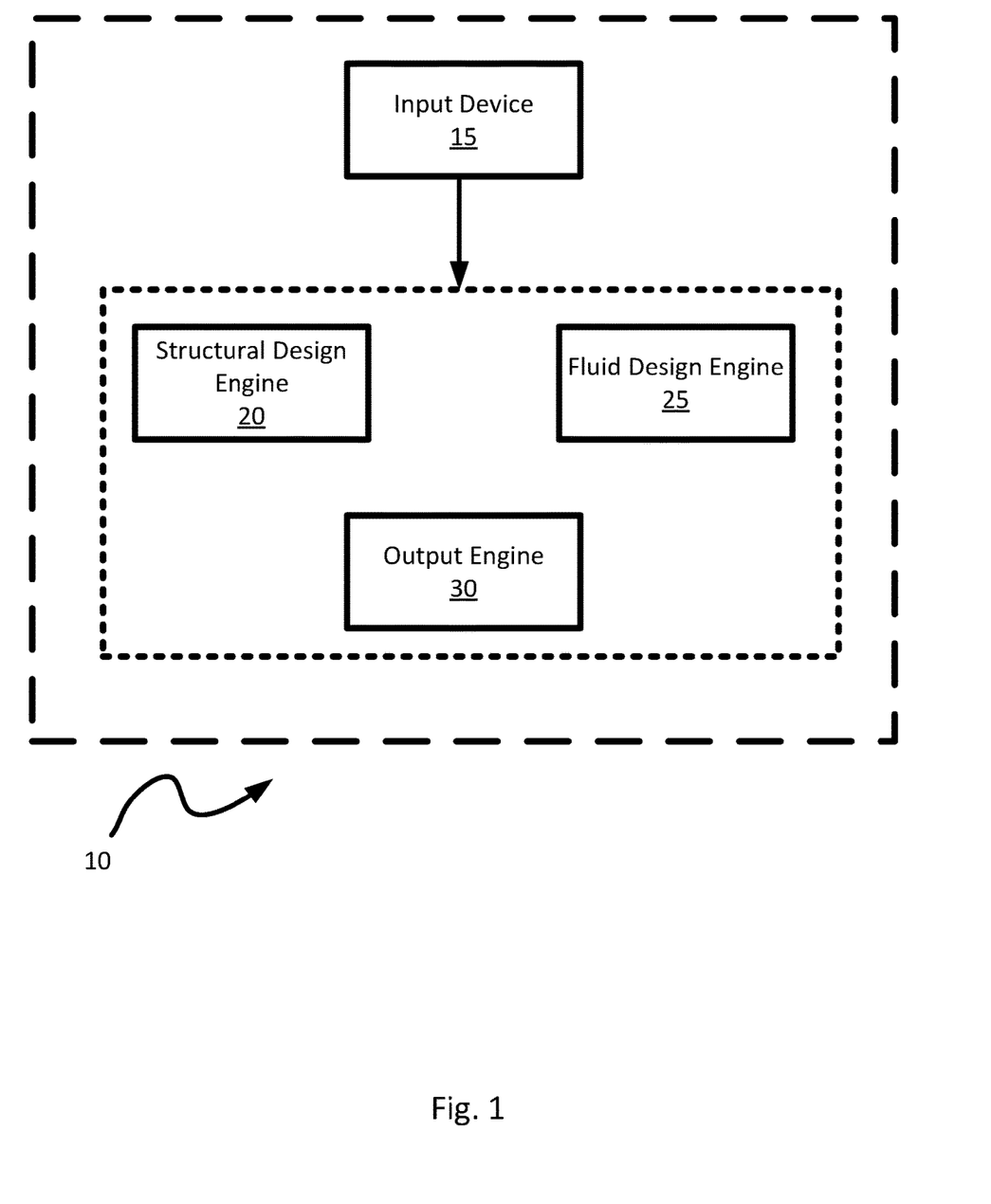
FIG. 1 is a block diagram of an example apparatus to combine print data with fluidic data of a multi-functional object.

Referring to FIG. 1, an example of an apparatus to combine print data with fluidic data of a multi-functional object for 3D printing is generally shown at 10. The apparatus 10 may include additional components, such as various memory storage units, interfaces to communicate with other devices, and further input and output devices to interact with a user or an administrator of the apparatus 10. In addition, the apparatus 10 may be separated into multiple components operating as a system as described in greater detail below. In the present example, the apparatus 10 includes an input device 15, a structural design engine 20, a fluid design engine 25, and an output engine 30. Although the present example shows the structural design engine 20, the fluid design engine 25, and the output engine 30 as separate components, in other examples, the structural design engine 20, the fluid design engine 25, and the output engine 30 may be part of the same physical component such as a microprocessor configured to carry out multiple functions.

The input device 15 is to receive design data. In the present example, the input device 15 is to communicate with external devices, such as a personal computer, tablet, smartphone, or other server over a network. The manner by which the input device 15 receives the design data is not particularly limited. In the present example, the apparatus 10 may be a server configured to receive design data from multiple sources, such as devices associated with multiple designers. Accordingly, the input device 15 may be a network interface communicating over the Internet. In other examples, the input device 15 may connect to the external devices via a peer to peer connection, such as over a wire or private network.

The design data is also not particularly limited. In the present example, the design data may include information about a geometry or load characteristic of a multi-functional object to be fabricated. For example, the multi-functional object may be a seat cushion for an automobile. Accordingly, the design data may include dimensions of the seat cushion which may be a three-dimensional shape of the seat cushion. The design data may also include maximum and minimum tolerances such that the seat cushion will be able to couple with existing attachment points of the automobile. Therefore, the load characteristics of the seat cushion may include a shape profile of a person using the seat cushion. Based on the shape profile, pressure points may be identified for consideration in the ultimate design of the seat cushion to increase comfort for the user.

The structural design engine 20 is to generate print data. In the present example, the print data may be used to print the multi-functional object on a 3D printer based on the design data received at the input device 15. In particular, the structural design engine 20 may receive the design data which may include a list of dimensions to describe the physical shape of the multi-functional object. In other examples, the design data may be in a CAD format or other design format. The structural design engine 20 may use the design data to generate print data in a format that can be used by a 3D printer, such as STL, OBJ, AMF, SVX, 3MF, or any other suitable format to print the multi-functional object.

In the present example, the structural design engine 20 may be used to calculate a load distribution function for the multi-functional object. Continuing with the present example of an automobile seat cushion, the load distribution function may be an approximation of the expected load characteristics of a user measure empirically, such as with a scanner or with an array of pressure sensors on a test seat. Accordingly, the load distribution function is to map and identify pressure points on the seat cushion or areas where no pressure is applied. Once the pressure points are identified, the structural design engine 20 may adjust the design of the multi-functional object to achieve a more uniform load distribution. For example, the structural design engine 20 may introduce protrusions in areas with little or no pressure. Conversely, for pressure points, the structural design engine 20 may introduce valleys to relieve some of the pressure.

In other examples, the structural design engine 20 may determine and apply a stiffness distribution function on the multi-functional object to address the pressure points in addition to or as an alternative to the addition of protrusions or valleys. The manner by which the stiffness distribution function is determined is not particularly limited and may include applying transform function to translate the load distribution function of the multi-functional object based. This process may be applied discretely across the multi-functional object. For example, a linear function may translate higher load into higher stiffness to provide more support. Therefore, the stiffness distribution function may be an inverse function to the load distribution function. Once the stiffness distribution function is determined, the structural design engine 20 translates the stiffness distribution function into a lattice structure described by the print data.

The fluid design engine 25 is to generate fluidic data. The manner by which the fluidic data is generated is not particularly limited. In the present example, the fluidic data is to represent a fluid channel within the multi-functional object to be fabricated using 3D printing techniques. The fluid channel may be part of a network of fluid channels that branch off from an inlet. In this example, the network of fluid channels may be to distribute a fluid, such as air or a liquid over a wide area on the surface of the multi-functional object. Continuing with the example of an automobile seat cushion, the network of fluid channels may be to distribute cool air or warm air to alter the temperature of the load, such as a user, on the seat cushion to increase comfort. For example, cool air may be used to cool a seat cushion on a hot day and warm air may be used to heat a seat cushion on a cold day.

In other examples, the fluid channel may be a fluidic connector embedded within a multi-functional object designed to custom fit within a cavity. In this example, the fluid channel receives a fluid and directs the fluid from a reservoir (not shown) to a target location of an automobile. The multi-functional object may also be used to provide sound insulation or facilitate the installation of a multi-functional object to align a fluid channel by custom fitting a cavity as a secondary function.

It is to be appreciated that the generation of the fluidic data is not particularly limited and that the fluidic data may be automatically generated based on parameters of the lattice structure of the multi-functional object. For example, the fluid design engine 25 may use the design data received at the input device 15 along with a general description of the application, such as distributing fluid to a portion of a surface of the multi-functional object or directing fluid from one point of on the multi-functional object to a second point. Based on these descriptions, the fluid design engine 25 may determine the path of the fluid channel through the multi-functional object to obtain a target fluid flow characteristic, such as flow rate, volume, pressures, etc. In other examples, the fluidic data may be generated from additional data received. For example, the data associated with the fluid channel design may be generic and obtained from a database of fluid channel designs. The fluid channel designs may be generally applicable to a range of objects meeting specified criteria. For example, the data associated with the fluid channel design may be a fluid network to distribute hot and/or cool air to a generally flat surface are between upper and lower threshold values. In other example, the fluid channel design may simply be a connector spanning a predetermined distance.

The output engine 30 is to generate an output file based on the print data generated by the structural design engine 20 and the fluidic data generated by the fluid design engine 25. The output file is to represent the multi-functional object for 3D printing. Accordingly, the output file may be in a format that can be used by a 3D printer, such as STL, OBJ, AMF, or 3MF, similar to the print data generated by the structural design engine 20.

In the present example, the output engine 30 is to perform a merge of the fluidic data and the print data. In particular, the output engine 30 is to carry out a Boolean merge to generate an output file of a single unitary multi-functional object for 3D printing. The manner by which the merge function is performed is not particularly limited. For example, a three-dimensional level approach may be used. However, as 3D models are complex, using a three-dimensional level approach may be computationally expensive and may also be prone to calculation errors.

In other examples, a two-dimensional level approach may be used to merge the fluidic data from the fluid design engine 25 and the print data from the structural design engine 20. In this approach the fluidic data and the print data may be positioned to overlap each other and aligned. The alignment of the fluidic data and the print data may be carried out using various methods. For example, the center-of-mass for each of the fluidic data and the print data may be aligned. As another example, fiducial marks may be added or identified in each of the fluidic data and the print data. For example, the fiducial mark may be a feature of the multi-functional object, such as a corner. The fluidic data and the print data are then independently sliced to a thickness that is approximately a limit for the 3D printing device to which the output file will be sent. Each slice is then merged using a two-dimensional operation and subsequently send to the 3D printer for printing. The merged slices are to be combined to form the output file. The output file is transmitted to the 3D printer for printing the multi-functional object as a plurality of slices.

Figure 2:
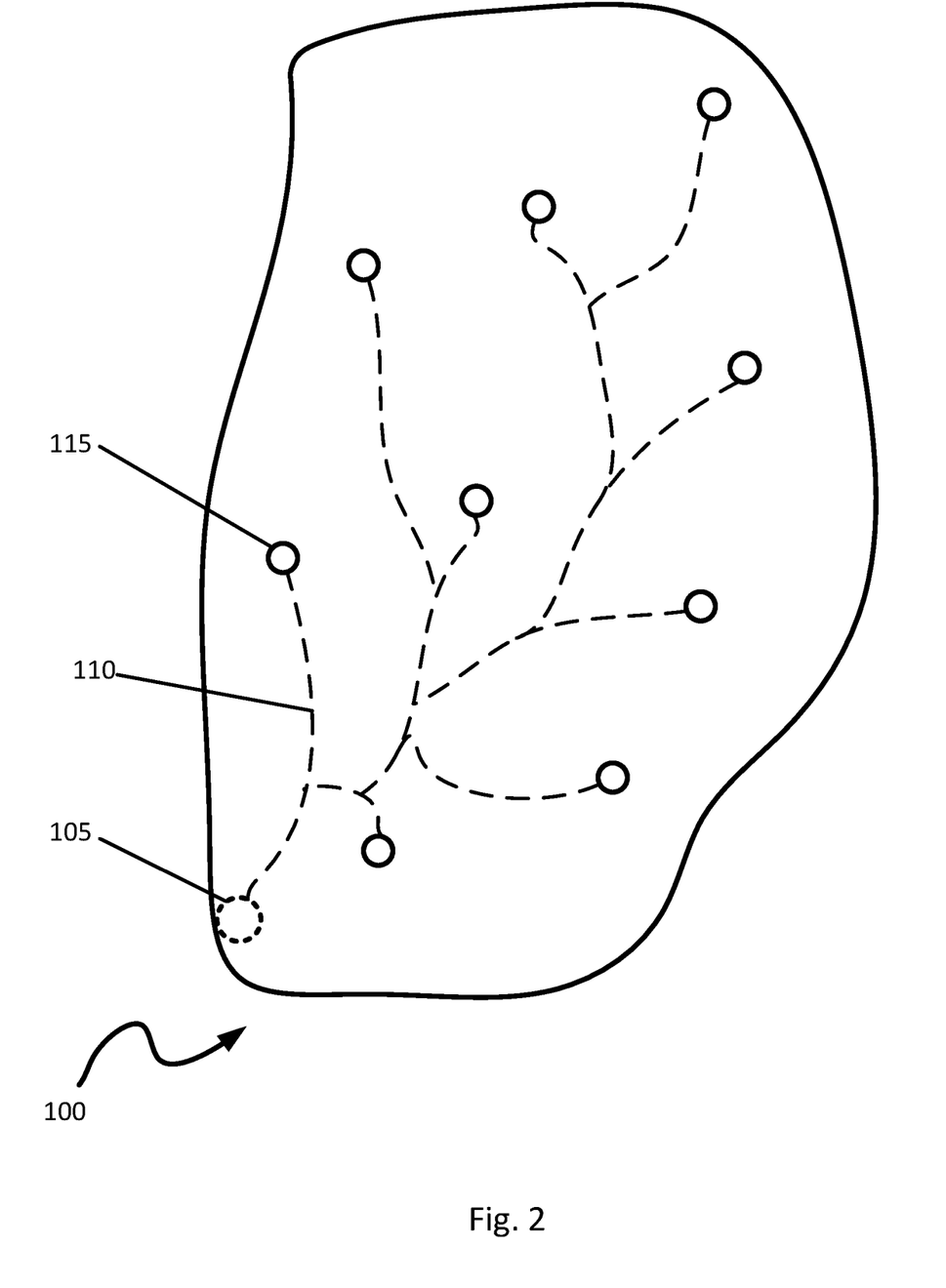
FIG. 2 is an example of a multi-functional object.

Referring to FIG. 2, an example of a multi-functional object generated by the apparatus 10 is generally shown. In the present example, the multi-functional object is a seat cushion 100 of a vehicle, such as an automobile. The seat cushion 100 includes heating and cooling features which are implemented by flowing air through the seat cushion 100. Accordingly, the seat cushion 100 includes an inlet 105, a plurality of fluid channels 110, and a plurality of outlets 115.

The design and fabrication of the seat cushion 100 may be carried out by the apparatus 10. As an example, an automobile manufacturer may provide the apparatus 10 with design data that describes the shape of the seat cushion 100 and a desired stiffness distribution function. The stiffness distribution function may be obtained using data from a body scanner measuring the contact shape of the human body when sitting on the seat cushion 100. This scan can then be used to create the shape of the seat cushion 100 such that the seat cushion mates with the human body well.

The manufacturer may also provide the apparatus 10 with additional data associated with a desired fluid flow through the plurality of fluid channels. For example, the manufacturer may define the locations of the inlet 105 and the outlets 115 to provide a target air flow distribution based on the air flow rate at the inlet 105. In other examples, the airflow rate may be adjusted, such as by adjusting a pump speed.

The apparatus 10 then generates an output file for 3D printing. The output file includes a lattice structure configured to allow for the fluid channels to be formed in the seat cushion 100. Accordingly, the seat cushion 100 is fabricated as a single multi-functional object instead of being assembled from multiple parts with channels inserted during the manufacturing process. Although the present example is of a seat cushion from an automobile other multi-functional objects may be fabricated using the apparatus 10 and a 3D printer. As another example, instead of the seat cushion 100, a headrest with speakers or resonance chambers to improve sound quality may be fabricate using a similar process.

Figure 3:
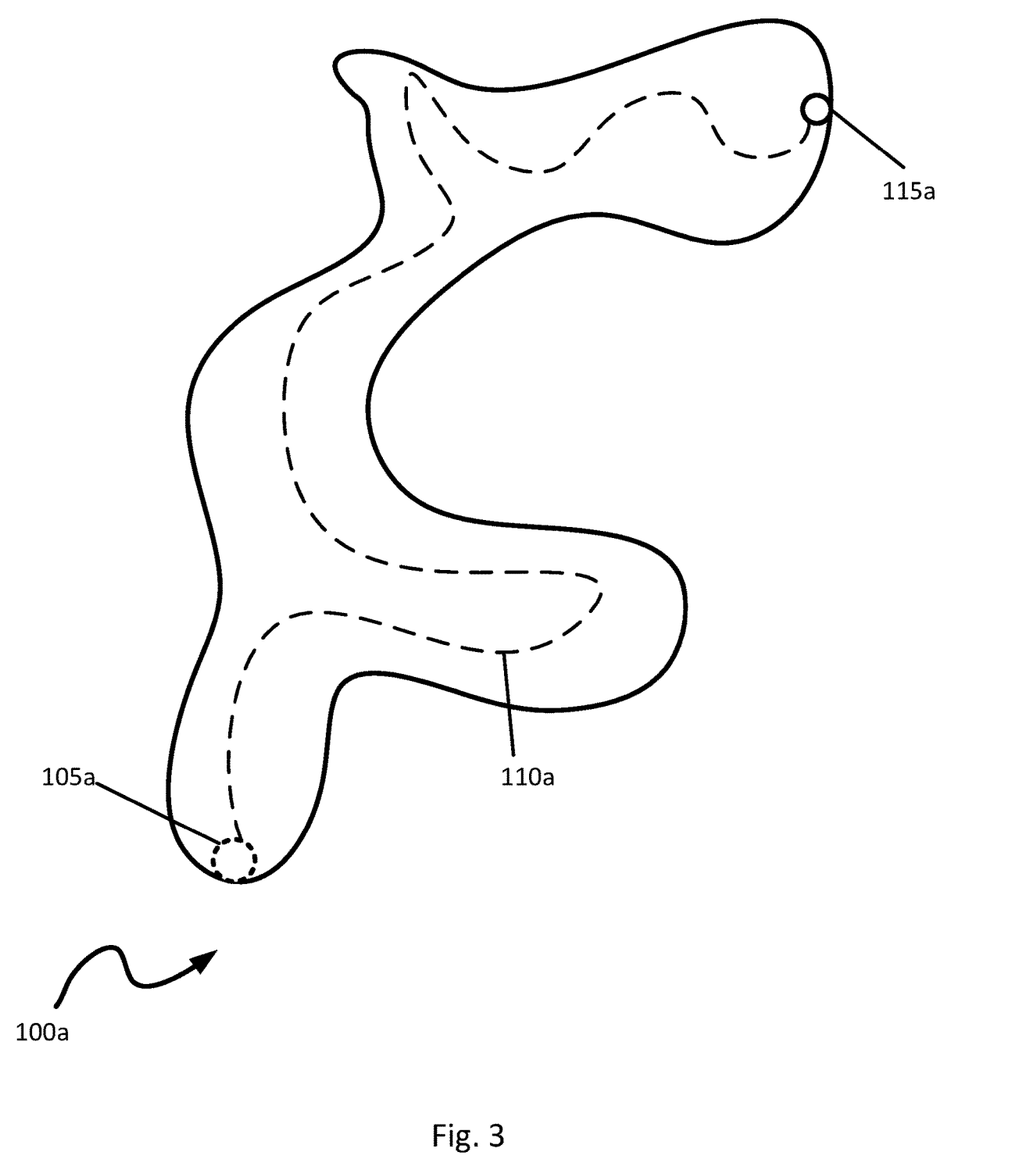
FIG. 3 is an example of another multi-functional object.

Referring to FIG. 3, an example of another multi-functional object generated by the apparatus 10 is generally shown. In the present example, the multi-functional object is a fluidic connector 100a for use in an automobile. The fluidic connector 100a is generally to transport fluid from the inlet 105a to an outlet 115a via a fluid channel 110a.

The design and fabrication of the fluidic connector 100a may be carried out in part by the apparatus 10. In particular, the automobile manufacturer may provide the apparatus 10 with design data that describes the shape of a cavity in an automobile that is to be filled to reduce vibrational noises. The fluidic connector 100a may have a uniform stiffness distribution function that is not particularly limited. For example, the stiffness of the fluidic connector 100a may be determined by the automobile manufacturer after carrying out various acoustic tests to improve vibration dampening.

The manufacturer may also provide the apparatus 10 with additional data associated with a desired fluid flow through the fluidic connector 100a. Although a straight line may be the shortest path through the body of the fluidic connector 100a, other factors may be considered. For example, if the pressure of the fluid it too high, resistance in the fluidic connector 100a may be introduced by adding curves as shown in FIG. 3. In addition, regions of the cavity may be proximate to components of the automobile that may be hot and thus the fluid flow may be configured to avoid such hot spots.

The apparatus 10 then generates an output file for 3D printing. The output file includes a lattice structure configured to allow for the fluid channel to be formed in the fluidic connector 100a. Accordingly, the fluidic connector 100a is fabricated as a single multi-functional object. Furthermore, but designing the fluidic connector 100a to custom fit a cavity, the installation of the fluidic connector 100a during the assembly of the automobile would be less susceptible to human error as the fluidic connector 100a is intended to fit in a cavity when installed in the correct orientation.

Figure 4:
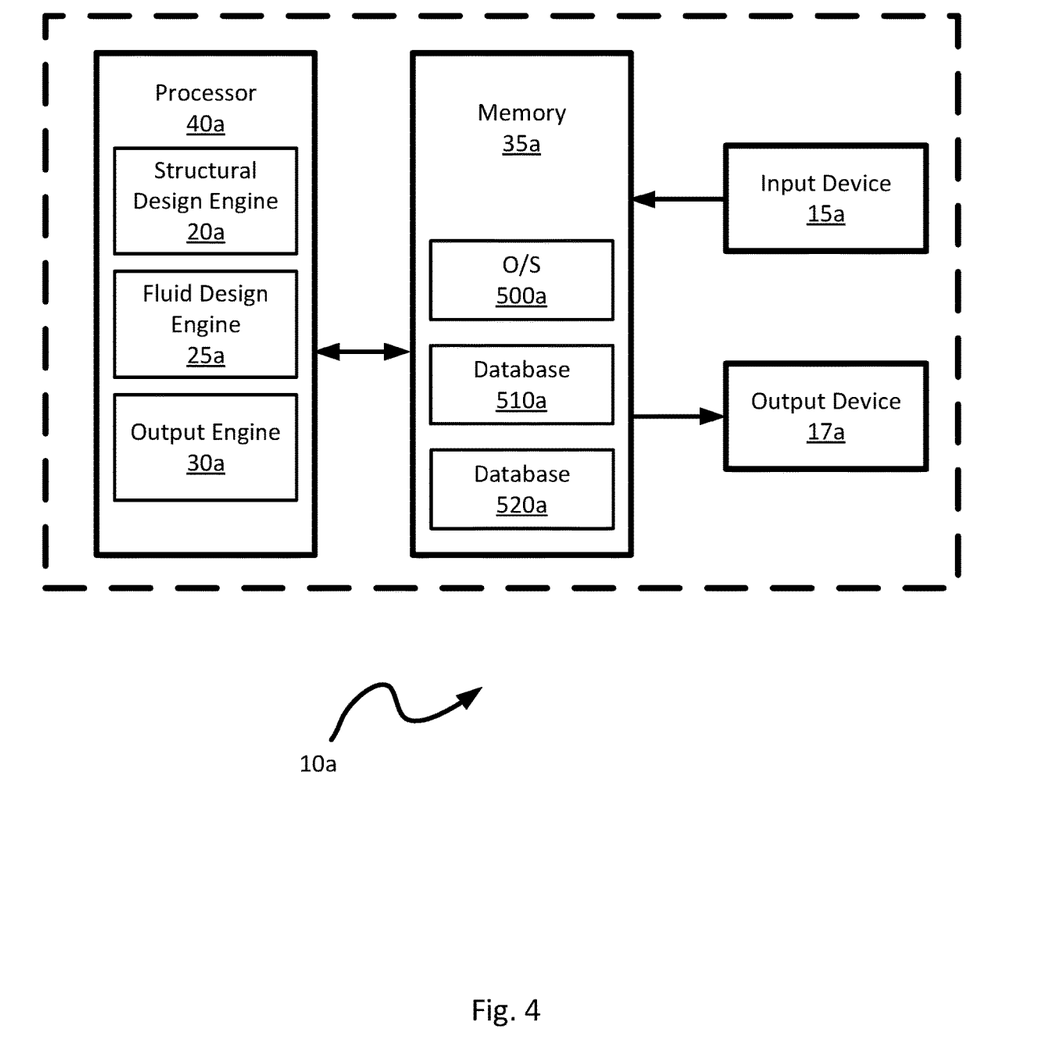
FIG. 4 is a block diagram of another example apparatus to combine print data with fluidic data of a multi-functional object.

Referring to FIG. 4, another example of an apparatus to combine print data with fluidic data of a multi-functional object for 3D printing is generally shown at 10a. Like components of the apparatus 10a bear like reference to their counterparts in the apparatus 10, except followed by the suffix "a". The apparatus 10a includes an input device 15a, an output device 17a, a structural design engine 20a, a fluid design engine 25a, an output engine 30a, and a memory storage unit 35a. In the present example, the structural design engine 20a, the fluid design engine 25a, and the output engine 30a are implemented by the processor 40a.

The memory storage unit 35a is to store data used to generate the output file, such as design data received at the input device 15a, and the output file generated by the output engine 30a. Accordingly, in the present example, the memory storage unit 35a may be in communication with the input device 15a to receive the design data from an external source, for example, via a network connection. In addition, the memory storage unit 35a may also be in communication with the output device 17a, which is used to transmit an output file to a 3D printed. In addition, the memory storage unit 35a is to maintain a database 510a to store design data from the input device 15a and a database 520a to store output files received from the output engine 30a. The manner by which the memory storage unit 35a stores or maintains the database 510a and the database 520a is not particularly limited. In the present example, the memory storage unit 35a may maintain a table in each of the database 510a and the database 520a to store and index the design data and the output files, respectively. In other examples, the memory storage unit 35a may also combine the databases 510a and 520a into a single database where the types of files are indexed separately.

The memory storage unit 35a components are not particularly limited. For example, the memory storage unit 35a may include a non-transitory machine-readable storage medium that may be, for example, an electronic, magnetic, optical, or other physical storage device. In addition, the memory storage unit 35a may store an operating system 500a that is executable by the processor 40a to provide general functionality to the apparatus 10a. For example, the operating system may provide functionality to additional applications. Examples of operating systems include Windows™, maCOS™, iOS™, Android™, Linux™, and Unix™. The memory storage unit 30a may additionally store instructions to operate at the driver level as well as other hardware drivers to communicate with other components and peripheral devices of the apparatus 10a.

Figure 5:
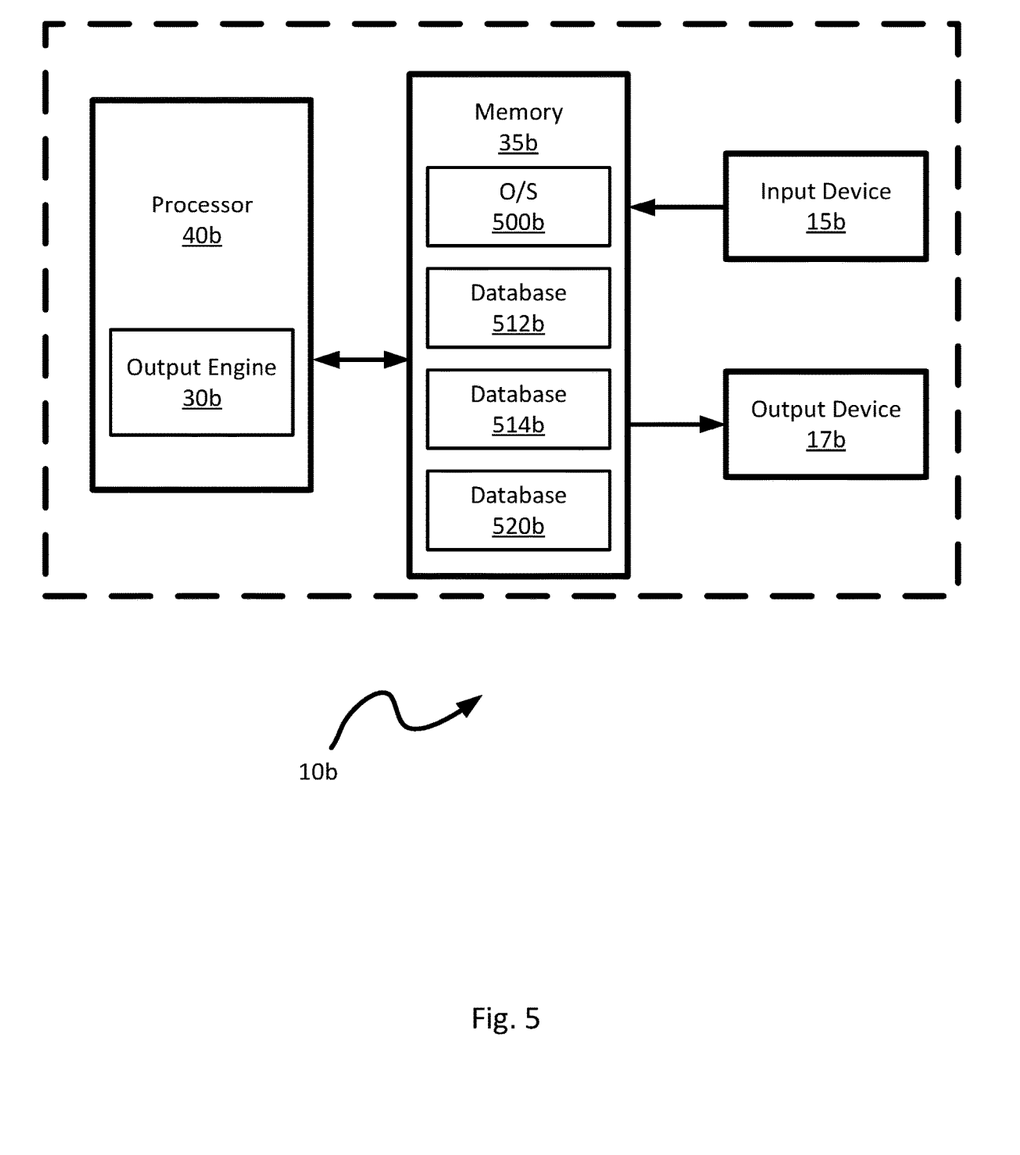
FIG. 5 is a block diagram of another example apparatus to combine print data with fluidic data of a multi-functional object.

Referring to FIG. 5, another example of an apparatus to combine print data with fluidic data of a multi-functional object for 3D printing is generally shown at 10b. Like components of the apparatus 10b bear like reference to their counterparts in the apparatus 10a, except followed by the suffix "b". The apparatus 10b includes an input device 15b, an output device 17b, an output engine 30b implemented by a processor 40b, and a memory storage unit 35b.

In the present example, the apparatus 10b does not include a structural design engine or a fluid design engine. Instead, the apparatus 10b is to merge print data and fluidic data from an external source to generate the output file using the output engine 30b. Accordingly, in the present example, the memory storage unit 35b is to maintain a database 512b to store print data, a database 514b to store fluidic data, and a database 520b to store output files received from the output engine 30b. The manner by which the memory storage unit 35b stores or maintains the databases 512b, 514b, and 520b is not particularly limited. In the present example, the memory storage unit 35b may maintain a table in each of the databases 512b, 514b, and 520b to store and index the design data and the output files, respectively. In other examples, the memory storage unit 35b may also combine the databases 512b, 514b, and 520b into a single database where the types of files are indexed separately.

Figure 6:
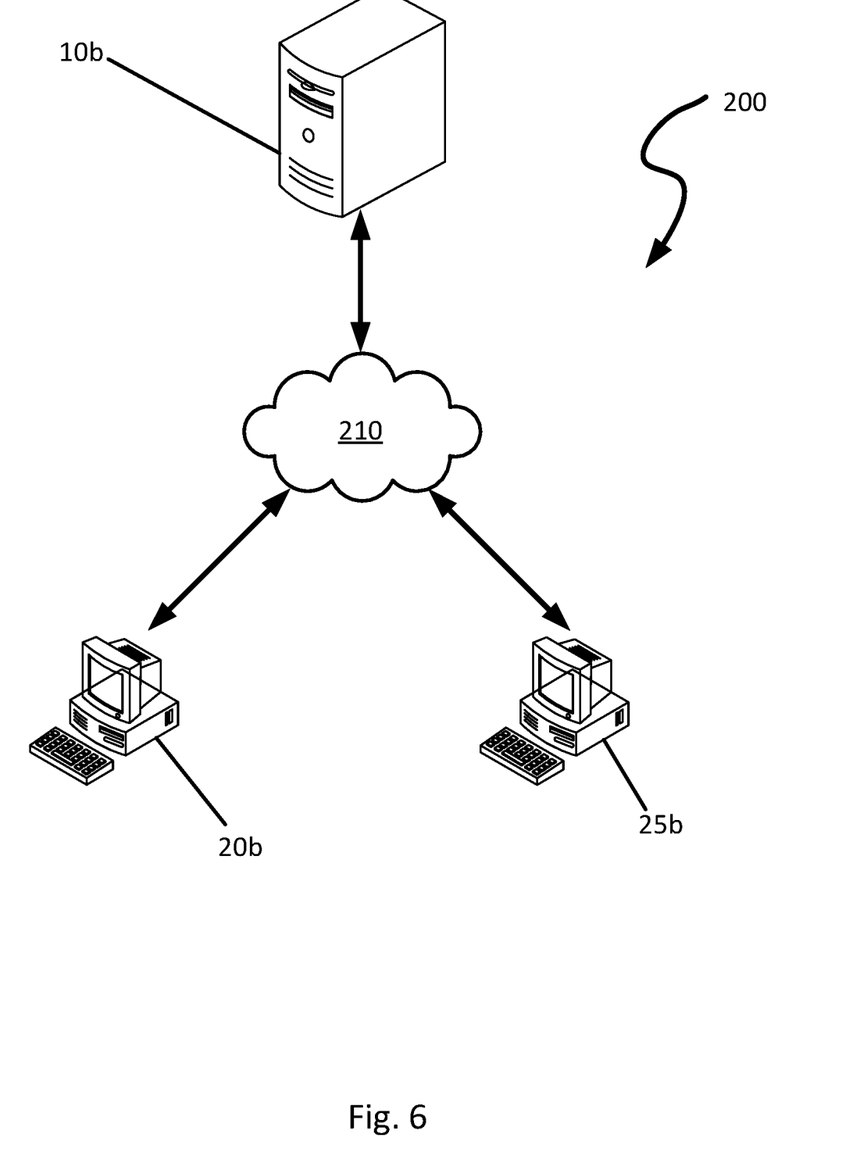
FIG. 6 is a block diagram of an example system to combine print data with fluidic data of a multi-functional object.

Referring to FIG. 6, an example of a multi-functional object design system to combine print data with fluidic data of a multi-functional object for 3D printing is generally shown at 200. In the present example, the apparatus 10b is in communication with a structural design device 20b and a fluid design device 25b via a network 210. It is to be appreciated that the structural design device 20b and the fluid design device 25b are not limited and additional devices capable of performing the design functions may be substituted.

It is to be appreciated that in the system 200, the apparatus 10b may be a server centrally located. The apparatus 10b may be connected to the structural design device 20b and the fluid design device 25b to allow for designing to be carried out remotely. For example, the apparatus 10b may be located at a first location. The structural design device 20b may then be located at a second location where the print data may be generated.

In this example the structural design device 20b may be a desktop computing device to generate print data. The print data may be transmitted via the network 210 to the apparatus 10b. Similarly, the fluid design device 25b may be a desktop computing device at a different location to generate fluidic data. The fluidic data may be transmitted via the network 210 to the apparatus 10b. Accordingly, once the apparatus 10b receives the print data and fluidic data, the output engine 30b of the apparatus 10b may process it to merge the print data and fluidic data in a similar manner as in the apparatus 10a.

Figure 7:
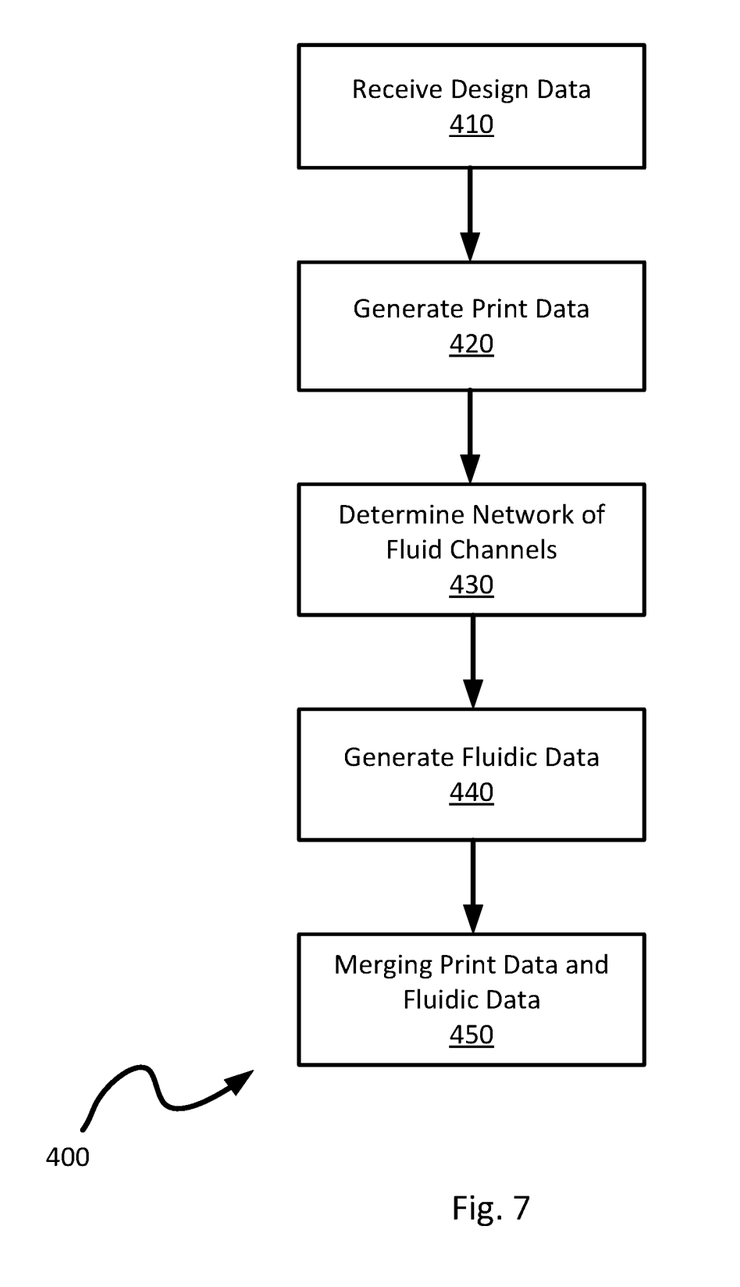
FIG. 7 is a flowchart of an example method of combining print data with fluidic data of a multi-functional object.

Referring to FIG. 7, a flowchart of an example method of combining print data and fluidic data is generally shown at 400. In order to assist in the explanation of method 400, it will be assumed that method 400 may be performed with the apparatus 10. Indeed, the method 400 may be one way in which apparatus 10, 10a, or 10b may be used. Furthermore, the following discussion of method 400 may lead to a further understanding of the apparatus 10, 10a, or 10b. In addition, it is to be emphasized, that method 400 may not be performed in the exact sequence as shown, and various blocks may be performed in parallel rather than in sequence, or in a different sequence altogether.

Beginning at block 410, design data is received at the input device 15. The design data is not limited and may include information about a multi-functional object to be printed. The information may include information about a geometry or load characteristic of a multi-functional object to be fabricated. For example, the multi-functional object may be a seat cushion for an automobile. Accordingly, the design data may include dimensions of the seat cushion which may be a three-dimensional shape of the seat cushion. The design data may also include maximum and minimum tolerances such that the seat cushion will be able to couple with existing attachments points of the automobile. A shape profile of a person using the seat cushion may also be included in the design data. Based on the shape profile, pressure points may be identified for consideration in the ultimate design of the seat cushion to increase comfort for the user.

Block 420 generates print data based on the information received at block 410. The print data generated may be used to print the multi-functional object on a 3D printer. The generation of the print data is not particularly limited and may involve converting the requirements from the design data into a format that may be used by a 3D printer. Various features of the multi-functional object may also be taken into consideration. For example, if the design data received at block 410 includes a load distribution function, the load distribution function may be used to determine a stiffness distribution function for the multi-functional object. The stiffness distribution function may then be incorporated into the generation of the print data.

Block 430 determines a network of fluid channels dispersed throughout the multi-functional object to distribute a fluid. The network of fluid channels may be based on the information in the design data received at block 410. For example, the design data may include a general distribution pattern or area for the fluid. Next, block 440 involves generating fluidic data based on the network of fluid channels. In the present example, the fluidic data is automatically generated. However, in other examples, the fluidic data may be generated manually by a user.

Block 450 merges the print data and the fluidic data to generate an output file. In the present example, the output file is in a format to be transmitted to a 3D printer. In other examples, the output file may be a CAD file for storage or for further design work by a user. The merge of the fluidic data and the print data is not limited and may include the output engine 30 carrying out a Boolean merge to generate an output file for a single multi-functional object.

Accordingly, the apparatus 10 may provide way to facilitate the design and fabrication of multi-functional components. In particular, by providing a way to combine various features and functionality of a multi-functional object into a single file, the costs associated with 3D printing the multi-functional object is decreased.

It should be recognized that features and aspects of the various examples provided above may be combined into further examples that also fall within the scope of the present disclosure.

What is claimed is:

1. A system comprising:
a processor; and
a memory storing instructions executable by the processor to:
receive design data for an object including information about a geometry and load characteristics of the object;

generate fluidic data representing a fluid channel to be included within the object;
generate print data based on the design data, the print data corresponding to structural features of the object generated separately from the fluid channel represented by the fluidic data, the print data generated in a first format usable by a three-dimensional printer to print the object without the fluid channel;
merge the fluidic data and the print data to generate an output file in a second format usable by the three-dimensional printer to three-dimensionally print the object with the fluid channel; and
cause the three-dimensional printer to three-dimensionally print the object with the fluid channel in accordance with the output file to physically generate the object with the fluid channel.

2. The system of claim 1, wherein the instructions are executable by the processor to further calculate a load distribution function approximating the load characteristics of the object.

3. The system of claim 2, wherein the instructions are executable by the processor to further determine a stiffness distribution function based on the load distribution function.

4. The system of claim 1, wherein the fluid channel is part of a network of fluid channels within the object to distribute a fluid through the object.

5. The system of claim 4, wherein the object is a seat cushion.

6. The system of claim 5, wherein the fluid is to alter a temperature of a load on the object.

7. The system of claim 1, wherein the fluidic data and the print data are merged in a Boolean manner.

8. The system of claim 7, wherein the instructions are executable by the processor to further align the fluidic data and the print data with one another using fiducial marks, such that the fluidic data and the print data are merged after and in accordance with having been aligned with one another.

9. A method comprising:
receiving, by a processor, design data for an object including information about the object;
determining a network of fluid channels to be included in the object to distribute a fluid based on the information about the object;
generating, by the processor, fluidic data based on the network of fluid channels;
generating, by the processor, print data based on the design data, the print data corresponding to structural features of the object generated separately from the network of fluid channels on which basis the fluidic data is generated, the print data generated in a first format usable by a three-dimensional printer to three-dimensionally print the object without the network of fluid channels;
merging, by the processor, the print data and the fluidic data to generate an output file in a second format usable by the three-dimensional printer to three-dimensionally print the object with the network of fluid channels; and
causing, by the processor, the three-dimensional printer to three-dimensionally print the object with the network of fluid channels in accordance with the output file to physically generate the object with the network of fluid channels.

10. The method of claim 9, further comprising calculating, by the processor, a load distribution function to approximate load characteristics of the object.

11. The method of claim 10, further comprising, by the processor, determining a stiffness distribution function based on the load distribution function.

12. The method of claim 9, wherein merging the print data and the fluidic data comprises performing a Boolean merge.

13. A non-transitory machine-readable storage medium encoded with instructions executable by a processor to:
receive design data for an object including information about a geometry and load characteristics of the object;
receive fluidic data representing a network of fluid channels to be included in the object to distribute a fluid based on the information about the object;
generate print data based on the design data, the print data corresponding to structural features of the object generated separately from the network of fluid channels on which basis the fluidic data is generated, the print data generated in a first format usable by a three-dimensional printer to three-dimensionally print the object without the network of fluid channels;
merge the print data and the fluidic data to generate an output file in a second format usable by the three-dimensional printer to three-dimensionally print the object with the network of fluid channels; and
cause the three-dimensional printer to three-dimensionally print the object with the network of fluid channels in accordance with the output file to physically generate the object with the network of fluid channels.

14. The non-transitory machine-readable storage medium of claim 13, wherein the instructions are executable by the processor to further calculate a load distribution function to approximate the load characteristics of the object.

15. The non-transitory machine-readable storage medium of claim 14, wherein the instructions are executable by the processor to further determine a stiffness distribution function based on the load distribution function.

16. The system of claim 1, further comprising the three-dimensional printer.

17. The system of claim 1, wherein the first format of the print data and the second format of the output file are a same format.

18. The system of claim 1, wherein the first format of the print data and the second format of the output file are different formats.

* * * * *